United States Patent [19]
Takahashi et al.

[11] Patent Number: 5,749,396
[45] Date of Patent: May 12, 1998

[54] PRESSURIZED FLUID SUPPLY HOSE AND METHOD OF MANUFACTURING THE SAME

[75] Inventors: Hiroyuki Takahashi; Nobuhiko Yamamoto, both of Okazaki, Japan

[73] Assignee: Toyoda Koki Kabushiki Kaisha, Kariya, Japan

[21] Appl. No.: 626,792

[22] Filed: Apr. 2, 1996

[30] Foreign Application Priority Data

Apr. 3, 1995 [JP] Japan ................................ 7-077944

[51] Int. Cl.⁶ ................................................ F16L 55/04
[52] U.S. Cl. .......................... 138/26; 138/113; 138/108; 29/890.144
[58] Field of Search .............................. 138/109, 99, 112, 138/113, 114, 108, 26; 29/890.144; 285/256, 259

[56] References Cited

U.S. PATENT DOCUMENTS

| 4,215,726 | 8/1980 | Tagami ................... 138/28 X |
| 4,794,955 | 1/1989 | Ejima et al. ................ 138/30 |
| 5,094,271 | 3/1992 | Fritz et al. ................. 138/39 |
| 5,201,343 | 4/1993 | Zimmermann et al. ........... 138/30 |

*Primary Examiner*—Paul C. Lewis
*Attorney, Agent, or Firm*—Oblon, Spivak, McClelland, Maier & Neustadt, P.C.

[57] ABSTRACT

A pressurized fluid supply hose which conducts pressurized fluid from a pump to a fluid operating device is disclosed. A nipple is caulked on an outer surface of a spiral tube formed by spirally winding two band members. By a caulking process, the nipple is formed at its inner surface with a flat portion and two taper portions. The taper portions are successive to the flat portion and sloped to gradually increase the inner diameter toward both ends of the nipple. The outer surface of the spiral tube is also deformed along the flat portion and the taper portions to be secured to the inner surface of the nipple. The spiral tube with the nipple is inserted into a flexible rubber hose and fixed to the rubber hose at a position corresponding to the nipple. Since the nipple is caulked so that the caulked amount of the spiral tube is gradually decreased toward the both ends of the nipple, a large clearance is prevented from being made between two outer and inner band members. It is therefore possible to effectively perform the operation to reduce the pulsation in the pressurized fluid.

8 Claims, 9 Drawing Sheets

CAULKED AMOUNT $h_0$ OF SPIRAL TUBE

5,749,396

PRESSURIZED FLUID SUPPLY HOSE AND METHOD OF MANUFACTURING THE SAME

BACKGROUND OF THE INVENTION

1. Field of the Invention

The present invention relates to a pressurized fluid supply hose for conducting pressurized fluid discharged from a pump to a fluid operating device as a power steering apparatus. It also relates to a method of manufacturing the pressurized fluid supply hose.

2. Discussion of the Prior Art

In power steering apparatus for use in automobiles, pressurized fluid discharged from a pump has a pulsation which causes a noise in the power steering apparatus. To reduce the pulsation in the pressurized fluid, a pressurized fluid supply hose which is disposed between the pump and the power steering apparatus includes a flexible rubber hose in which a spiral tube formed by spirally winding two band members is received. The spiral tube makes two pressurized fluids which are different in phase of the pulsation and causes the two pressurized fluids to interface with each other to reduce the pulsation.

There has been a pressurized fluid supply hose of the type wherein the spiral tube is secured to the flexible rubber hose at the middle portion thereof. In manufacturing of the pressurized fluid supply hose of this type, a nipple is first secured to the outer surface of the spiral tube by caulking. The spiral tube with the nipple is then inserted into the flexible rubber hose. Thereafter, a fixation socket is caulked on the outer surface of the flexible rubber hose at a position corresponding to the nipple.

According to the prior art, the nipple is caulked on the spiral tube in the following manner. Referring to FIG. 1, both ends of a nipple 30 are pressed from the directions shown by arrows at plural positions in the circumferential direction, by means of a caulking tool 31 having two pressing surfaces 31a, 31a parallel to the nipple 30. The inner surfaces of the both ends of the nipple 30 are thus pressed to a spiral tube 32 formed by spirally winding band members 32a and 32b, so that the nipple 30 is fixed to the spiral tube 32. Numeral 30a denotes grooves formed in the outer surface of the nipple 30 so as to improve fixation of the nipple 30 to a not-illustrated flexible rubber hose.

FIG. 2 shows a caulked portion at which the nipple 30 and the spiral tube 32 are fixed. In the manner described above, the pressing at the caulked portion causes one end of the nipple 30 having a constant thickness shown by the broken line to be deformed as shown by the solid line, whereby an inside diameter of the end of the nipple 30 is abruptly changed. As a result, a large clearance k is formed between two outer and inner band members 32a and 32b of the spiral tube 32 located in the vicinity of the end of the nipple 30. Since fluid leakage which takes place through the clearance k adversely affects the operation to reduce the pulsation in the pressurized fluid, the operation to reduce the pulsation is weakened. In case of decreasing a caulked amount of the nipple 30 to reduce the fluid leakage, the spiral tube 32 is likely to come out of the nipple 30.

Further, even if the caulked amount of the nipple 30 by the caulking tool 31 is set to be constant, the clearance k formed between the band members 32a and 32b of the spiral tube 32 varies on each hose due to dimensional error of the nipple 30 and the spiral tube 32 and due to dispersion of the caulked position. The variation of the clearance k causes the dispersion in the fluid leakage, resulting in instable quality of pressurized fluid supply hoses. In other words, hoses which are not effective in the operation to reduce the pulsation may be produced.

FIG. 3 is a graph showing the relationships of fluid leakage $Q_O$ at the caulked portion and loosing force $F_O$ of the spiral tube 32 with respect to the caulked amount $h_O$ of the spiral tube 32 according to the prior art. These data are experimentally obtained under such conditions that temperature T of the pressurized fluid is 25[°C.], pressure P of the pressurized fluid is 0.5[kgf/cm$^2$] and experiment time t is 1[min].

The caulked amount $h_O$ of the spiral tube 32 is a maximum amount by which an outer diameter of the spiral tube 32 is actually changed. The fluid leakage $Q_O$ at the caulked portion represents amount of the pressurized fluid leaking from the clearance k formed between the band members 32a and 32b of the spiral tube 32, and the loosing force $F_O$ of the spiral tube 32 represents force necessary for loosing the spiral tube 32 from the nipple 30. In FIG. 3, experimental values of the fluid leakage $Q_O$ and the loosing force $F_O$ are shown as relative values when a standard value $Q_A$ of the fluid leakage and a standard value $F_A$ of the loosing force are set to "1". The standard value $Q_A$ of the fluid leakage and the standard value $F_A$ of the loosing force are those for judging quality of the manufactured hoses. When the conditions are satisfied that the fluid leakage $Q_O$ is equal to or smaller than the standard value $Q_A$ and the loosing force $F_O$ is equal to or larger than the standard value $F_A$, the manufactured hose is permitted as a product.

In the graphs of FIG. 3, when the caulked amount $h_O$ of the spiral tube 32 is equal to or smaller than 0.41 millimeters, the values of the fluid leakage $Q_O$ become equal to or smaller than 1 so that the standard value $Q_A$ thereof is satisfied. Further, when the caulked amount $h_O$ is equal to or larger than 0.30 millimeters, the values of the loosing force $F_O$ become equal to or larger than 1 so that the standard value $F_A$ thereof is satisfied. Therefore, the caulked amount $h_O$ which satisfies both of the standard value $Q_A$ of the fluid leakage and the standard value $F_A$ of the loosing force has tolerance of 0.11 millimeters. Since the median of the caulked amount $h_O$ within the tolerance is 0.355 millimeters, and the caulked amount $h_O$ with the tolerance is represented as 0.355±0.055 millimeters.

Consequently, when a target value of the caulked amount $h_O$ is set to 0.355 millimeters, an error allowable range at the caulking process becomes 0.055 millimeters which is extremely small. Because the dimension of each product is not managed in mass production, it is difficult to manufacture in large quantities products which satisfy both of the standard value $Q_A$ of the fluid leakage and the standard value $F_A$ of the loosing force.

SUMMARY OF THE INVENTION

Accordingly, it is an object of the present invention to provide an improved pressurized fluid supply hose which is capable of effectively reducing a pulsation in a pressurized fluid.

Another object of the present invention is to provide an improved pressurized fluid supply hose wherein a large clearance between band members of a spiral tube is prevented from being formed by a caulking process for fixing a nipple to the spiral tube.

A further object of the present invention is to provide an improved pressurized fluid supply hose which can securely hold the nipple 30 to the flexible rubber hose without grooves formed in the outer surface of the nipple.

A still further object of the present invention is to provide an improved method of manufacturing a pressurized fluid supply hose which has the character mentioned above.

Briefly, a pressurized fluid supply hose which conducts pressurized fluid from a pump to a fluid operating device comprises a spiral tube, a nipple caulked on an outer surface of the spiral tube so as to form at its inner surface a flat portion and two taper portions which are successive thereto and sloped to gradually increase the inner diameter toward both ends of the nipple, a flexible rubber hose for receiving the spiral tube, and means for fixing the nipple to the rubber hose. The outer surface of the spiral tube is so deformed as to be secured to the nipple by the flat portion and the taper portions. The position of the flat portion is substantially middle in an axial direction of the nipple.

With the configuration of the present invention, the nipple is largely caulked at its substantially middle position and the caulked amount is gradually decreased toward its both ends. By such caulking, the spiral tube is deformed so that the amount of the deformation is large at a position corresponding to the middle position of the nipple and is gradually decreased toward the both ends of the nipple. The outer diameter of the spiral tube is changed not partially but gently as a whole, whereby it can be avoided that a large clearance is made between two band members of the spiral tube. Therefore, the fluid leakage from the spiral tube is so little as to effectively perform the operation to reduce the pulsation in the pressurized fluid. As a result, the quality of pressurized fluid supply hoses become stable. Even when the caulked amount of the nipple increases so as to increase the force for holding the nipple on the spiral tube, the spiral tube is always maintained to be sealed state.

Further, the outer surface of the nipple is deformed to a concave shape by which the fixation of the nipple to the flexible rubber hose is strengthened. This can avoid the machining of grooves in the outer surface of the nipple according to the prior art, thereby decreasing the manufacturing cost.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

Figure 8:
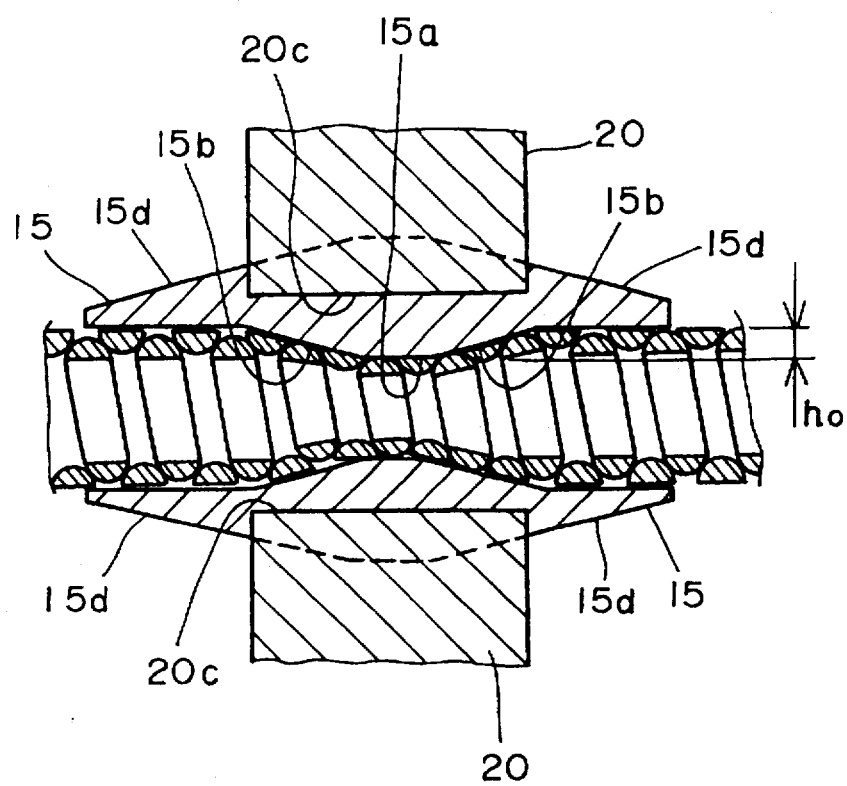
Figure 9:
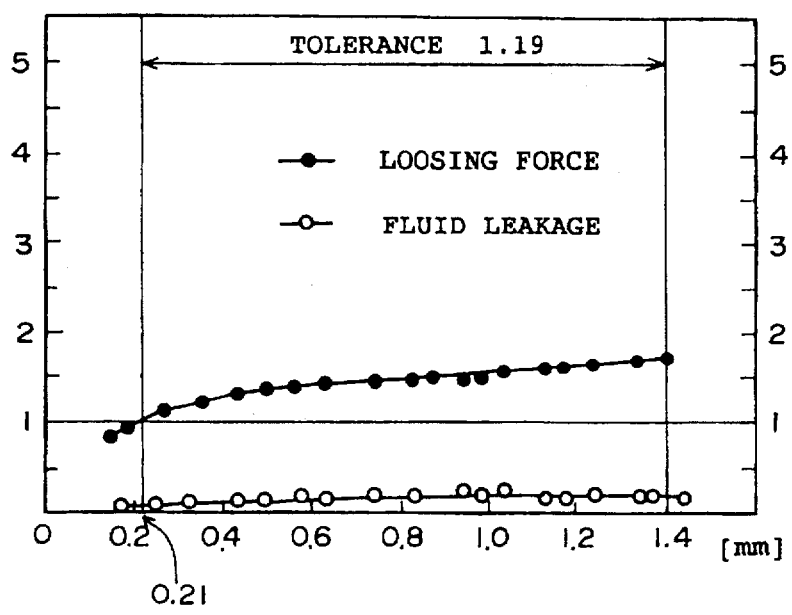

FIG. 8 is a sectional view of the nipple and the spiral tube at the caulked portion after caulking according to the second embodiment of the present invention; and FIG. 9 is graphs showing the relationship between the caulked amount of the spiral tube and fluid leakage at the caulked portion and the relationship between the caulked amount of the spiral tube and force necessary for loosing the spiral tube according to the present invention.

DETAILED DESCRIPTION OF THE PREFERRED EMBODIMENTS

Figure 1:
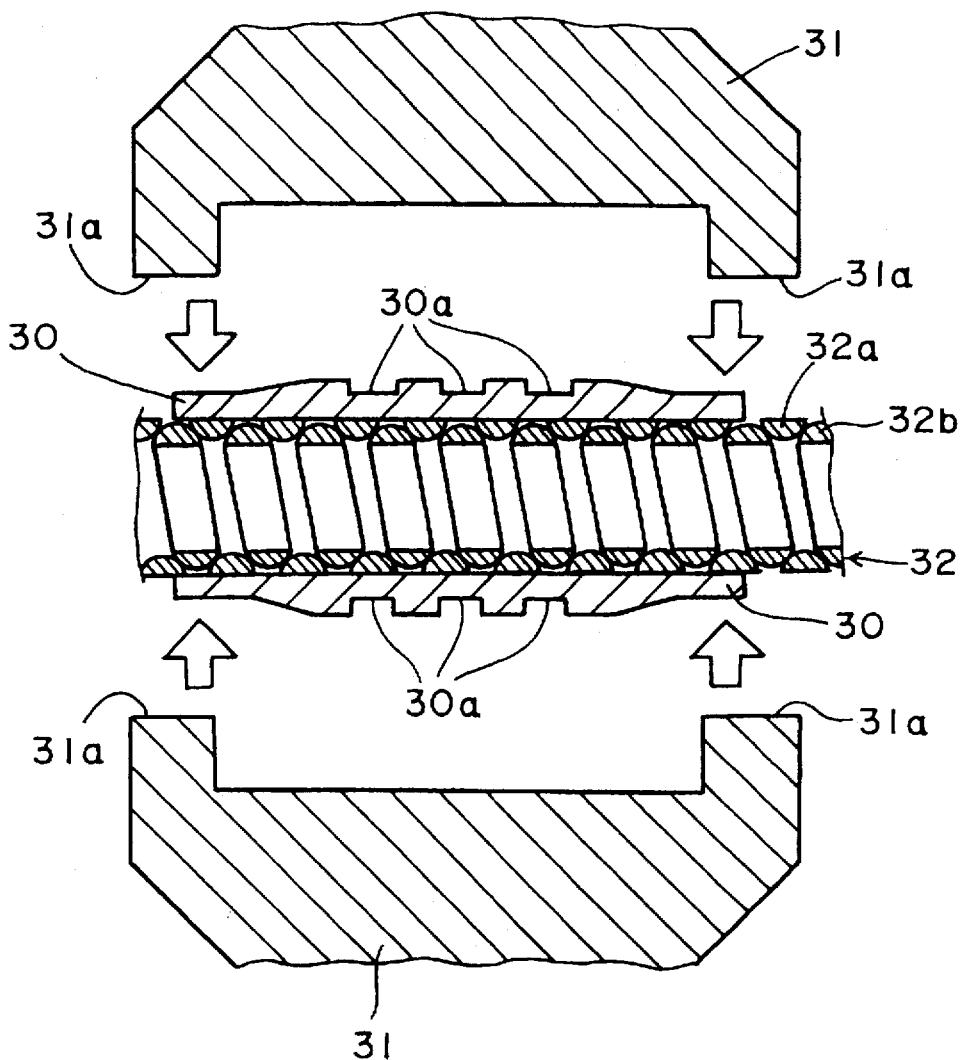
FIG. 1 is a sectional view of a nipple and a spiral tube before caulking according to the prior art.
Figure 2:
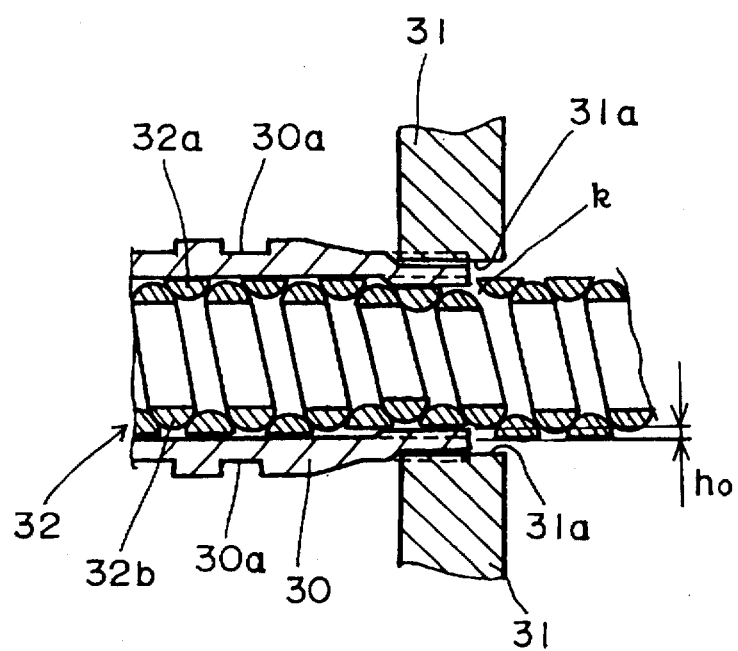
FIG. 2 is an enlarged sectional view of the nipple and the spiral tube at one end of the nipple after caulking according to the prior art.
Figure 3:
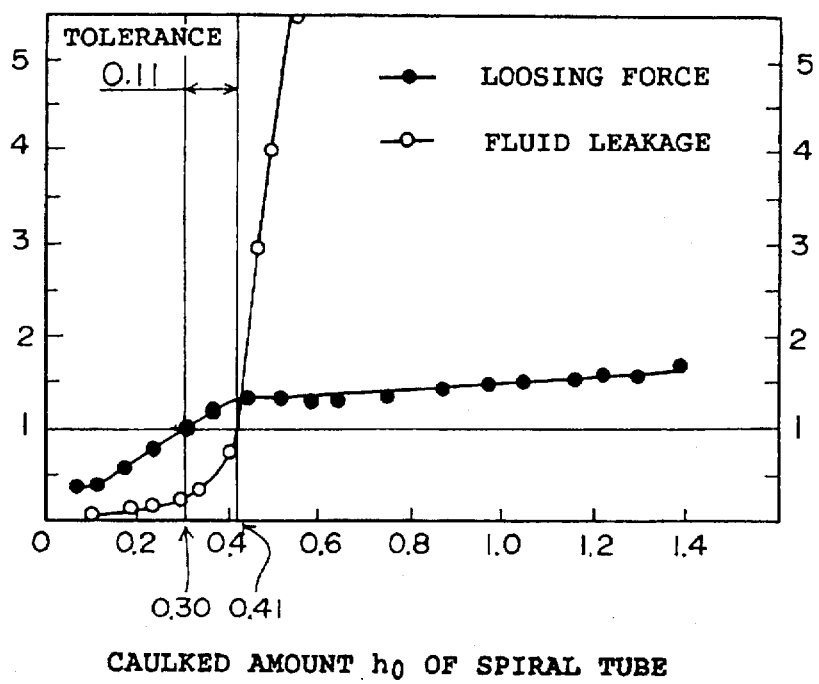
FIG. 3 is graphs showing the relationship between a caulked amount of the spiral tube and fluid leakage at the caulked portion and the relationship between the caulked amount of the spiral tube and force necessary for loosing the spiral tube according to the prior art.
Figure 4:
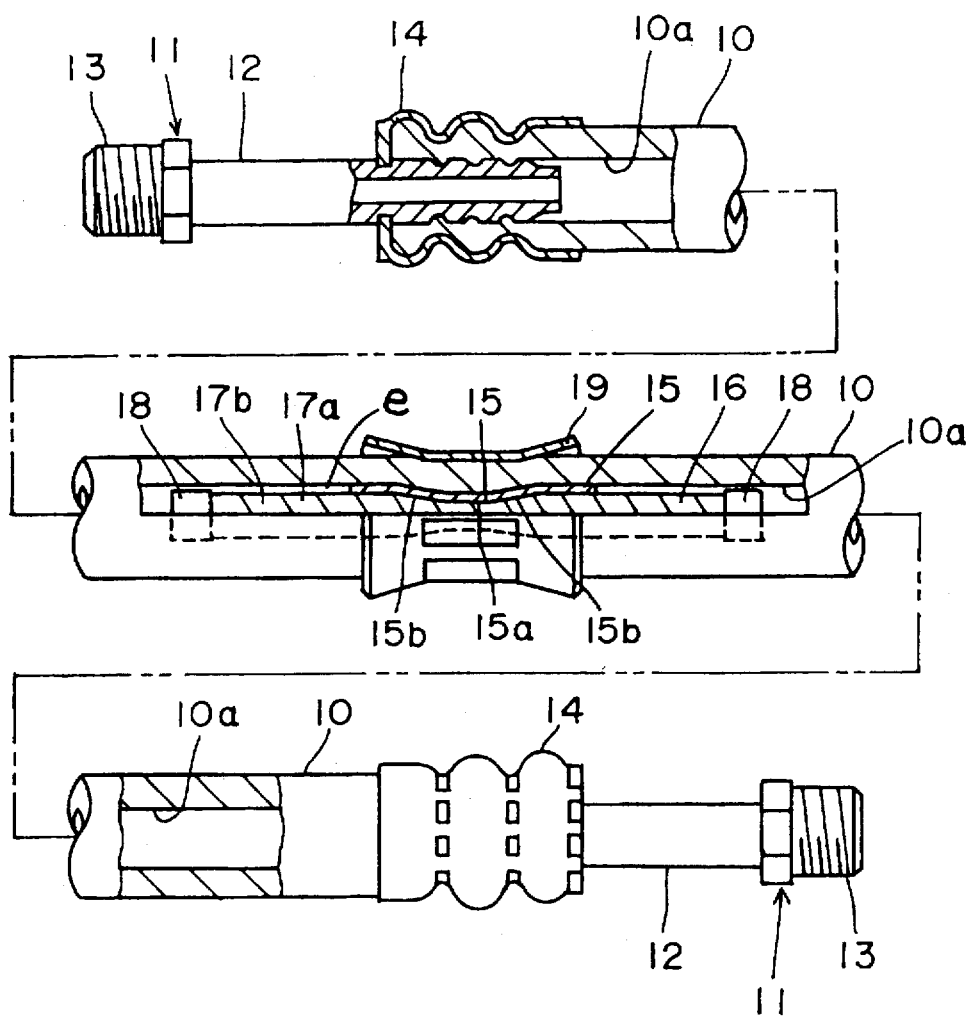
FIG. 4 is a sectional view of a pressurized fluid supply hose according to the present invention.

A pressurized fluid supply hose of the present invention will now be described with reference to the drawings. In FIG. 4, numeral 10 denotes a flexible rubber hose capable of expanding and contracting, and numerals 11 denote connecting assemblies for connecting both ends of the rubber hose 10 with a pump and a power steering apparatus, respectively (both not shown).

Each of the connecting assemblies 11 comprises a steel pipe 12 one end of which is inserted into an internal bore 10a of the rubber hose 10, a joint 13 screwed into a discharge port of the pump or an inlet port of the power steering apparatus so as to joint the steel pipe 12 thereto, and a socket 14 for fluidally fixing the steel pipe 12 to the rubber hose 10. The socket 14 attached to the outer surface of the steel pipe 12 is fixed to the outer surface of the rubber hose 10 by the well-known caulking to have a wave-shaped section in the axial direction. This causes the steel pipe 12 to be bodily fixed to the rubber hose 10.

In the internal bore 10a of the rubber hose 10 and at almost middle position of the hose 10, a cylindrical spiral tube 16 formed by spirally winding two band members 17a and 17b is arranged with a nipple 15 whose length in the axial direction is shorter than the spiral tube 16. The nipple 15 is fixed to the outer surface of the spiral tube 16 by caulking. After caulking, the inner surface in the section in the axial direction of the nipple 15 is formed with a flat portion 15a at its substantially middle position and taper portions 15b successive thereto whose diameter is made larger toward the both ends of the nipple 15. Since the nipple 15 is pressed to the spiral tube 16 at the flat portion 15a and the taper portions 15b, the spiral tube 16 is largely caulked with the flat portion 15a and is caulked with the taper portions 15b so that the caulked amount of the spiral tube 16 is gradually decreased toward the both ends of the nipple 15.

A fixation socket 19 is attached to the outer surface of the rubber hose 10 at the position corresponding to the nipple 15. The socket 19 is fixed to the outer surface of the rubber hose 10 by the well-known caulking to have a flat-shaped section in the axial direction, whereby the spiral tube 16 is bodily fixed to the rubber hose 10 through the nipple 15. Both opening ends of the spiral tube 16 are free from caulking and are covered by protection caps 18 for preventing damage to the internal bore 10a of the rubber hose 10.

Figure 5:
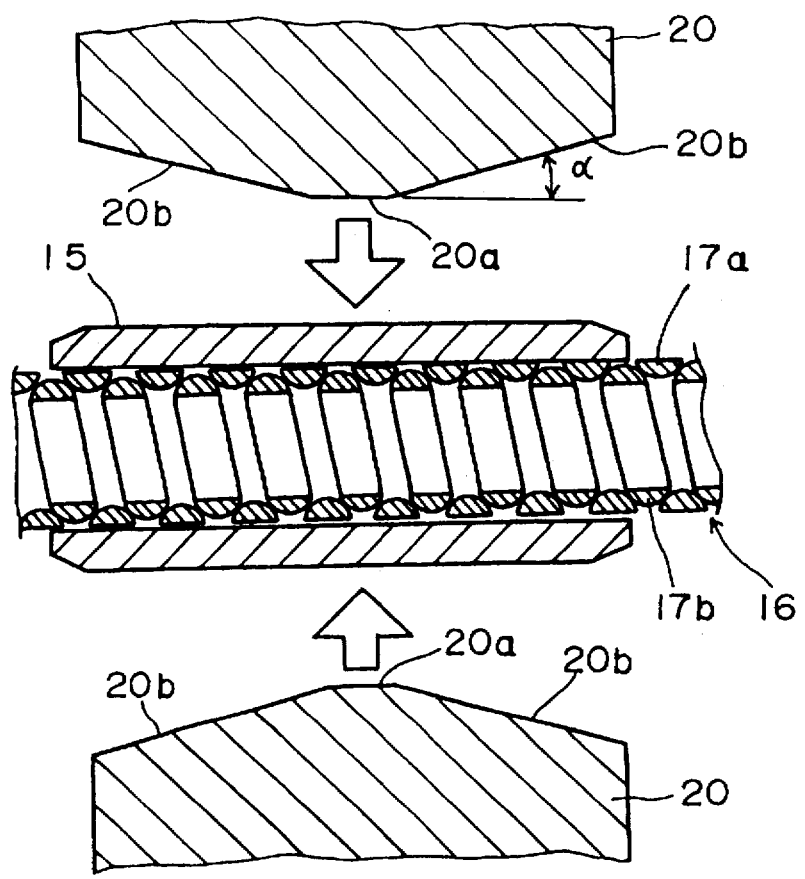
FIG. 5 is a sectional view of the nipple and the spiral tube at a caulked portion before caulking according to the first embodiment of the present invention.

Next, a process of caulking the nipple 15 on the spiral tube 16 by a caulking tool 20 will be described in detail with reference to FIGS. 5 and 6, as the first embodiment. Before caulking, the inner and outer surfaces in the section in the axial direction of the nipple 15 has flat shapes parallel to the outer surface of the spiral tube 16, as shown in FIG. 5. The caulking tool 20 has a flat pressing surface 20a parallel to the outer surface of the nipple 15 and two taper pressing surfaces 20b extending from both ends of the flat pressing surface 20a, in the section in the axial direction of the nipple 15. The taper pressing surfaces 20b are inclined at a predetermined angle α to be gradually away from the outer surface of the nipple 15. It is desirable that the angle α of the taper pressing surfaces 20b is within a range of 8°±5°. In case of sectioning in a direction perpendicular to the axial direction, the flat pressing surface 20a and the taper pressing surfaces 20b have circular shapes which correspond to the outer surface of the nipple 15.

The spiral tube 16 is first inserted into the nipple 15. The caulking tool 20 is then set to eight positions at which the flat pressing surface 20a is faced with the substantially middle position of the nipple 15. These positions are equally spaced to each other in the circumferential direction, only two of which are shown in FIG. 5. The caulking tool 20 is subsequently moved from these positions in the directions shown by arrows. The flat pressing surface 20a and the taper pressing surfaces 20b gradually presses the nipple 15 to caulk it by a predetermined amount.

Figure 6:
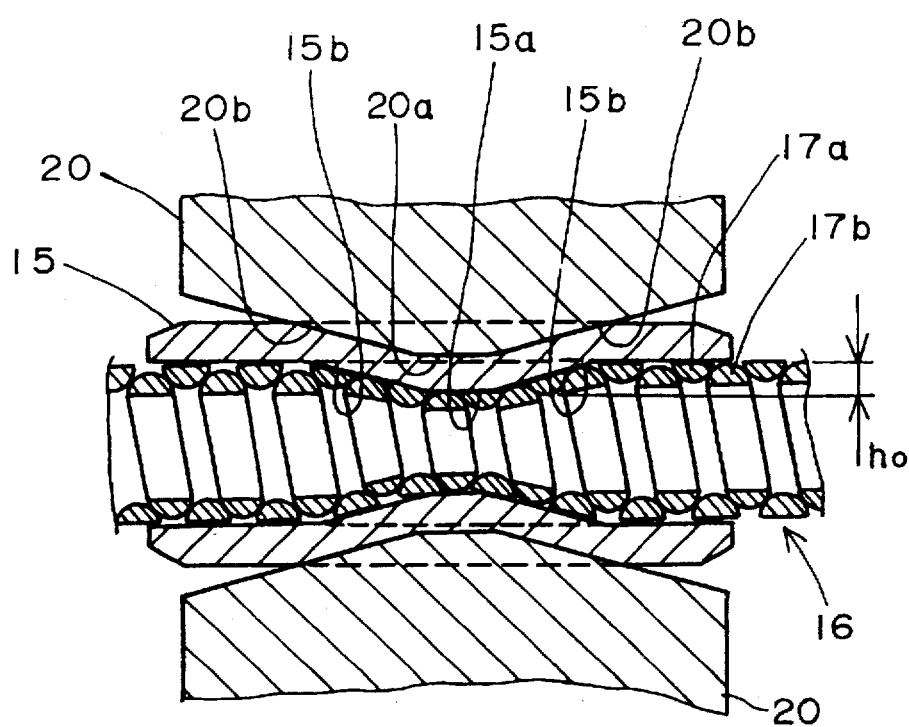
FIG. 6 is a sectional view of the nipple and the spiral tube at the caulked portion after caulking according to the first embodiment of the present invention.

FIG. 6 is a sectional view in the axial direction of the nipple after the caulking process. The inner surface of the nipple 15 is formed with a flat portion 15a at the position pressed with the flat pressing surface 20a and taper portions 15b at the positions pressed with the taper pressing surfaces 20b of the caulking tool 20. The spiral tube 16 is also deformed along the flat portion 15a and the taper portions 15b of the nipple 15. In other words, the spiral tube 16 is caulked with the flat portion 15a of the nipple 15 by a large amount $h_0$ and is caulked with the taper portions 15b so that the caulked amount is gradually decreased toward the both ends of the nipple 15.

Where the length of the spiral tube 16, the position at which the nipple 15 is fixed to the spiral tube 16, and the position of the nipple 15 in the rubber hose 10 are preset to appropriate ones, the phase of the pulsation in the pressurized fluid which flows into a chamber e defined between the outer surface of the spiral tube 16 and the inner surface of the rubber hose 10 is offset by one-half wavelength to the phase of the pulsation in the pressurized fluid which is admitted into the connecting assembly 11 of the pump side, upon reflection at the end surface of the nipple 15. These pressurized fluids which are different in phase of the pulsation are interfaced with each other in the chamber e and at the opening end of the spiral tube 16 to reduce the pulsation of the pressurized fluid supplied to the power steering apparatus.

In the pressurized fluid supply hose having the above-mentioned constitution, when pressurized fluid is discharged from the pump, the pressurized fluid having a pulsation is admitted into the internal bore 10a of the rubber hose 10 through the connecting assembly 11 of the pump side. Then, the pressurized fluid passes through the spiral tube 16. At that time, a part of the pressurized fluid in the rubber hose 10 flows into a chamber e (shown in FIG. 4) defined between the outer surface of the spiral tube 16 and the inner surface of the rubber hose 10. The part of the pressurized fluid having a pulsation is reflected by the end surface of the nipple 15, and is conducted as a pressurized fluid having the pulsation which is different in phase from the main stream within the spiral tube 16 into the connecting assembly 11 of the power steering apparatus side. Since the phase of the pulsation in the reflected pressurized fluid is offset by one-half wavelength to the phase of pulsation in the pressurized fluid admitted into the connecting assembly 11 of the pump side, two pressurized fluids which are different in phase of the pulsation join in the chamber e and at the opening end of the spiral tube 16 to interface with each other, so that the pulsation of the pressurized fluid is reduced.

In the first embodiment described above, by caulking the nipple 15 of the flat shape with the caulking tool 20 including the flat pressing surface 20a and the taper pressing surfaces 20b, the flat portion 15a and the taper portions 15b successive thereto whose diameter is made larger toward the both ends of the nipple 15 are formed on the inner surface of the nipple 15. However, numerous modifications and variations are possible within the scope of the above technical teachings. As a concrete example, the second embodiment of the present invention will be described with reference to FIGS. 7 and 8. In the section in the axial direction of the nipple 15, the caulking tool 20 is provided with a flat pressing surface 20c parallel to the outer surface of the nipple 15, while the outer surface of the nipple 15 is provided with a flat portion 15c of a large thickness at its middle position and taper portions 15d extending from both ends of the flat portion 15c. The taper portions 15d are inclined at a predetermined angle β to gradually decrease the thickness toward the both ends of the nipple 15. It is desirable that the angle β of the taper portions 15d of the nipple 15 is within a range of 8°±5°. The length in the axial direction of the flat pressing surface 20c is longer than that of the flat portion 15c of the nipple 15.

Figure 7:
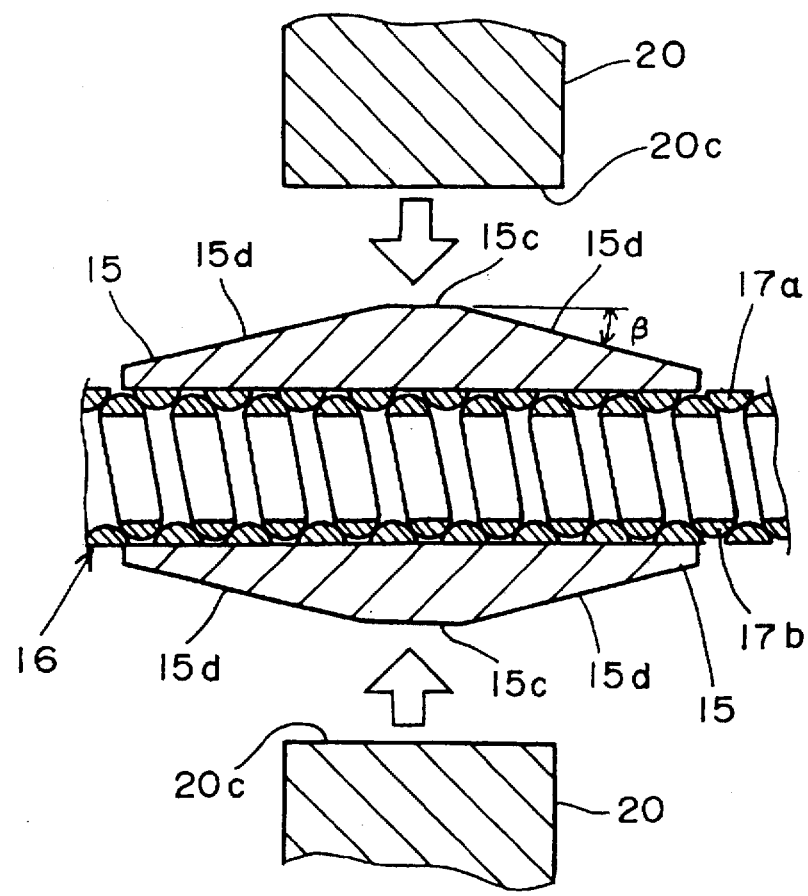
FIG. 7 is a sectional view of the nipple and the spiral tube at the caulked portion before caulking according to the second embodiment of the present invention.

With this constitution, when the caulking tool 20 is moved in the directions shown by the arrows in FIG. 7 from the positions at which the flat pressing surface 20c of the caulking tool 20 is faced with the flat portion 15c of the nipple 15, the flat pressing surface 20c gradually embeds into the outer surface of the nipple 15. Upon completion of the caulking, the inner surface in a section in the axial direction of the nipple 15 is formed with a flat portion 15a and taper portions 15b successive thereto whose diameter is made larger toward the both ends of the nipple 15, as shown in FIG. 8. Each of the taper portions 15b is inclined in the direction opposite to the corresponding taper portions 15d of the outer surface. The outer surface of the spiral tube 16 is so deformed that the caulked amount is large at the middle position of the nipple 15 and is gradually decreased toward the both ends of the nipple 15. This brings the same effects as the first embodiment of the present invention.

Incidentally, numerous variations in design so as to fix the spiral tube 16 and the nipple 15 more securely, e.g. screw machining and groove machining on the flat portion 15a and the taper portions 15b, are possible as far as the diameter of the spiral tube 16 is not abruptly changed between the band members 17a and 17b and the fluid leakage is within the allowable range.

FIG. 9 is graphs showing the relationships of fluid leakage $Q_0$ at the caulked portion and loosing force $F_0$ of the spiral tube 16 with respect to the caulked amount $h_0$ of the spiral tube 16 according to the present invention. These data are experimentally obtained under such conditions that temperature T of the pressurized fluid is 25[°C.], pressure P of the pressurized fluid is 0.5[kgf/cm$^2$], and experiment time t is 1[min]. In this experiment, the caulked amount $h_0$ of the spiral tube 16 is changed in range of $0 \leq h_0 \leq 1.4$[mm].

The caulked $h_0$ of the spiral tube 16 is a maximum amount by which an outer diameter of the spiral tube 16 is actually changed by the caulking tool 20. The fluid leakage $Q_0$ at the caulked portion represents amount of the pressurized fluid leaking from the clearance formed between the band members 17a and 17b of the spiral tube 16, and the loosing force $F_0$ of the spiral tube 16 represents force necessary for loosing the spiral tube 16 from the nipple 15. In FIG. 9, experimental values of the fluid leakage $Q_0$ and the loosing force $F_0$ are shown as relative values when both of a standard value $Q_A$ of the fluid leakage and a standard value $F_A$ of the loosing force are set to "1". The standard value $Q_A$ of the fluid leakage and the standard value $F_A$ of the loosing force are those for judging quality of the manufactured hoses. When the conditions are satisfied that the fluid leakage $Q_O$ is equal to or smaller than the standard value $Q_A$ and the loosing force $F_O$ is equal to or larger than the standard value $F_A$, the manufactured hose is permitted as a product.

In the graphs of FIG. 9, the values of the fluid leakage $Q_O$ are smaller than 1 at all caulked amounts $h_O$ in the experimental range of $0 \leq h_O \leq 1.4$[mm], so that the standard value $Q_A$ thereof is satisfied. Further, when the caulked amount $h_O$ is equal to or larger than 0.21 millimeters, the values of the loosing force $F_O$ becomes equal to or larger than 1 so that the standard value $F_A$ thereof is satisfied. Therefore, the caulked amount $h_O$ which satisfies both of the standard value $Q_A$ of the fluid leakage and the standard value $F_A$ of the loosing force has tolerance of at least 1.19 millimeters in the experimental range. Since the median of the caulked amount $h_O$ within the tolerance is 0.805 millimeters, the caulked amount $h_O$ with the tolerance is represented as 0.805±0.595 millimeters.

Accordingly, when a target value of the caulked amount $h_O$ is set to 0.805 millimeters, an error allowable range at the caulking process becomes 0.595 millimeters. This error allowable range is considerably wider than that of the prior art which is 0.055 millimeters. It is therefore possible in mass production to improve reliability that the products satisfy both of the standard value $Q_A$ of the fluid leakage and the standard value $F_A$ of the loosing force, and to make the quality of the products stable.

In the experiments according to the present invention and the prior art described above, the minimum values of the caulked amounts $h_O$ of the spiral tube 16 to satisfy the standard value $F_A$ of the loosing force are 0.21 millimeters and 0.30 millimeters, respectively. Namely, in the present invention, the standard value $F_A$ of the loosing force can be satisfied by the caulking amount $h_O$ smaller than the prior art.

As described above, the nipple 15 is caulked so that the caulked amount of the spiral tube 16 is gradually decreased toward the both ends of the nipple 15. In this state, the change in diameter for connecting the caulked portion and the non-caulked portions is gentle, and stress by the caulking is gradually released toward the both ends of the nipple 15. Therefore, a large clearance is not made between two outer and inner band members 17a and 17b of the spiral tube 16 located in the vicinity of the caulked portion. Even when the caulked amount $h_O$ of the spiral tube 16 increases so as to increase the force for holding the nipple 15 on the spiral tube 16, a large clearance is not made between the band members 17a and 17b of the spiral tube 16, whereby the spiral tube 16 is always maintained to be sealed state. The fluid leakage from the spiral tube 16 is little and is not changed in accordance with the change of the caulked amount $h_O$. It is therefore possible to effectively perform the operation to reduce the pulsation in the pressurized fluid.

Besides, when the nipple 15 is caulked, the outer surface of the nipple 15 is deformed to a concave shape by which the fixation of the nipple 15 to the flexible rubber hose 10 is strengthened. This can avoid machining of grooves in the outer surface of the nipple 15, thereby decreasing the manufacturing cost.

Obviously, numerous modifications and variations of the present invention are possible in light of the above teachings. It is therefore to be understood that within the scope of the appended claims, the present invention may be practiced otherwise than as specifically described herein.

What is claimed is:

1. A pressurized fluid supply hose comprising:
   a spiral tube;
   a nipple caulked on an outer surface of said spiral tube so as to form at its inner surface a flat portion and two taper portions which are successive thereto and sloped to gradually increase the inner diameter toward both ends of said nipple, so that the outer surface of said spiral tube is so deformed as to be secured to said nipple by said flat portion and said taper portions;
   a flexible rubber hose for receiving said spiral tube which is secured to said nipple; and
   means for fixing said nipple to said rubber hose.

2. A pressurized fluid supply hose as set forth in claim 1, wherein said means for fixing said nipple to said rubber hose comprises a socket which is fitted on an outer surface of said rubber hose at a position corresponding to said nipple and caulked from the outer side of said socket.

3. A pressurized fluid supply hose as set forth in claim 1, wherein the position of said flat portion is substantially in the middle in an axial direction of said nipple.

4. A method of manufacturing a pressurized fluid supply hose, comprising the steps of:
   inserting a spiral tube into a nipple;
   caulking said nipple by a caulking tool from the outer side of said nipple so as to form at its inner surface a flat portion and two taper portions which are successive thereto and sloped to gradually increase the inner diameter toward both ends of said nipple, so that an outer surface of said spiral tube is so deformed as to be secured to said nipple by said flat portion and said taper portions;
   inserting said spiral tube which is secured to said nipple, into a flexible rubber hose; and
   fixing said nipple to said rubber hose.

5. A method of manufacturing a pressurized fluid supply hose as set forth in claim 4, wherein the step of fixing said nipple to said rubber hose comprises the steps of:
   fitting a socket on an outer surface of said rubber hose at a position corresponding to said nipple; and
   caulking said socket from the outer side of said socket.

6. A method of manufacturing a pressurized fluid supply hose as set forth in claim 4, wherein said flat portion is formed at a substantially middle position in an axial direction of said nipple.

7. A method of manufacturing a pressurized fluid supply hose, comprising the steps of:
   inserting a spiral tube into a nipple which has a flat outer surface parallel to its inner surface;
   caulking said nipple from the outer side of said nipple by a caulking tool including a flat pressing surface parallel to the outer surface of said nipple and two taper pressing surfaces which are successive thereto and sloped to be gradually away from the outer surface of said nipple so as to form at its inner surface a flat portion and two taper portions which are successive thereto and sloped to gradually increase the inner diameter toward both ends of said nipple, so that an outer surface of said spiral tube is so deformed as to be secured to said nipple by said flat portion and said taper portions;
   inserting said spiral tube which is secured to said nipple, into a flexible rubber hose; and
   fixing said nipple to said rubber hose.

8. A method of manufacturing a pressurized fluid supply hose, comprising the steps of:

inserting a spiral tube into a nipple, an outer surface of said nipple having a flat portion parallel to its inner surface and two taper portions which are successive thereto and sloped to gradually decrease the outer diameter of said nipple;

caulking said nipple from the outer side of said nipple by a caulking tool including a flat pressing surface extending in parallel with the flat portion of said nipple so as to form at its inner surface a flat portion and two taper portions which are successive thereto and sloped to gradually increase the inner diameter toward both ends of said nipple, so that an outer surface of said spiral tube is so deformed as to be secured to said nipple by said flat portion and said taper portions;

inserting said spiral tube which is secured to said nipple, into a flexible rubber hose; and fixing said nipple to said rubber hose.

* * * * *